United States Patent [19]

Hotchkiss et al.

[11] 4,436,780
[45] Mar. 13, 1984

[54] NONWOVEN WIPER LAMINATE

[75] Inventors: Harry W. Hotchkiss; Patrick J. Notheis, both of Cobb County; Stephen M. Englebert, Cherokee County, all of Ga.

[73] Assignee: Kimberly-Clark Corporation, Neenah, Wis.

[21] Appl. No.: 414,214

[22] Filed: Sep. 2, 1982

[51] Int. Cl.³ .............................................. B32B 27/14
[52] U.S. Cl. ................................. 428/198; 428/195; 428/219; 428/220; 428/284; 428/286; 428/296; 428/298; 428/903; 428/913; 428/302; 428/326; 428/340; 428/537; 428/303
[58] Field of Search ............... 428/284, 286, 198, 289, 428/297, 298, 302, 303, 219, 220, 332, 340, 903, 913, 296, 326

[56] References Cited
U.S. PATENT DOCUMENTS

| D. 239,566 | 4/1976 | Vogt | D59/2 R |
| D. 264,512 | 5/1982 | Rogers | D59/2 B |
| 4,041,203 | 8/1977 | Brock et al. | 428/903 |
| 4,196,245 | 4/1980 | Kitson et al. | 428/903 |
| 4,298,649 | 11/1981 | Meitner | 428/212 |
| 4,307,143 | 12/1981 | Meitner | 428/903 |
| 4,328,279 | 5/1982 | Meitner et al. | 428/903 |
| 4,340,563 | 7/1982 | Appel et al. | 264/158 |

Primary Examiner—James J. Bell
Attorney, Agent, or Firm—William D. Herrick; R. Jonathan Peters; Howard Olevsky

[57] ABSTRACT

Nonwoven wiper having improved absorbency characteristics and streak free wiping properties having a laminate construction including a relatively high basis weight middle layer of meltblown thermoplastic microfibers and, on either side, a lightweight layer of generally continuous filament thermoplastic fibers having a larger average diameter. These wipers are strong, fabric-like, and are useful for a wide variety of applications including industrial uses, food services, as well as many others. The continuous filament layers provide strength and low lint properties while the combination exhibits improved wiping characteristics. The laminate is preferably bonded by application of heat and pressure and the individual components are preferably treated with a surfactant. The preferred combination of a layer of meltblown polypropylene microfibers having on either side a spunbonded polypropylene filament layer is particularly effective as an all purpose wiper.

9 Claims, 4 Drawing Figures

4,436,780

NONWOVEN WIPER LAMINATE

BACKGROUND OF THE INVENTION

1. Field of the Invention

This invention relates to disposable wiper products useful for a wide variety of industrial and consumer applications including those in the automotive, food services, and electrical industries as well as for general purpose household wiping. Such wipers must be low cost and yet provide the strength, absorbency, cloth-like character and other properties desirable for such wiping applications. Nonwoven fabrics, in general, have received wide acceptance as nonwoven disposable wipers both for specific applications and general purpose wiping. For many such applications nonwoven wipers can out-perform traditional cloth and paper wiping products. However, for some applications, it is desired to even further improve certain nonwoven wiper properties such as resistance to linting and streaking, and it is generally desirable to increase wiper absorbency and strength.

2. Description of the Prior Art

U.S. Pat. No. 4,307,143 to Meitner issued Dec. 22, 1981 describes meltblown microfiber wipers treated with a surfactant and embossed. Such wipers are demonstrated to have improved absorbency and wiping properties when compared with traditional wiper materials. U.S. Pat. No. 4,298,649 to Meitner dated Nov. 3, 1981 describes a multi-component nonwoven wiper having a layer of meltblown microfibers combined with a split film or fibrillated foam layer. This wiper exhibits low metal chip pick-up characteristics of particular interest in the automotive finishing application. This property is obtained without significant deterioration in wiping properties. U.S. Pat. No. 4,328,279 to Meitner and Englebert dated May 4, 1982 relates to a meltblown nonwoven wiper treated with certain surfactants to result in low sodium content of particular interest in electronics industry wiping application. U.S. Pat. No. 4,041,203 to Brock and Meitner dated Aug. 9, 1977 relates to nonwoven fabrics and sterile wrapper materials made by combining layers of meltblown thermoplastic fibers with one or more continuous thermoplastic filament layers. The disclosure recognizes that such materials can be treated for absorbency and used in wiper applications. U.S. Pat. No. 4,196,245 to Kitson, Gilbert, Jr., and Israel dated Apr. 1, 1980 relates to a composite nonwoven fabric useful in disposable surgical items and which can comprise one or more meltblown layers loosely bonded to one or more spunbounded layers.

The preparation of polyolefin microfiber webs is known and described, for example, in Wendt, *Industrial and Engineering Chemistry*, Vol. 48, No. 8 (1956) pages 1342 through 1346 as well as in U.S. Pat. Nos. 3,978,185 to Buntin et al issued Aug. 31, 1976, 3,795,571 to Prentice, issued Mar. 5, 1974, and 3,811,957 to Buntin issued May 21, 1974. The Buntin et al patent further discloses that mats of meltblown polyolefins are useful in wiping cloths and hydrocarbon absorption material.

Production of substantially continuous filaments is also known, and illustrative techniques are set forth in U.S. Pat. Nos. Kinney 3,338,992 and 3,341,394, Levy 3,276,944, Peterson 3,502,538, Hartmann 3,502,763 and 3,509,009, Dobo 3,542,615 and Harmon Canadian Pat. No. 803,714. Reference may also be had to the above identified Brock and Meitner U.S. Pat. No. 4,041,203 for methods of producing combinations of meltblown thermoplastic fibers and continuous filament thermoplastic fibers. Commonly assigned U.S. patent application Ser. No. 146,450 to Appel and Morman, now U.S. Pat. No. 4,340,563 dated July 20, 1982, describes an alternative method for producing continuous filament thermoplastic webs.

SUMMARY

The present invention relates to an improved nonwoven wiper having low lint and reduced streaking characteristics while also demonstrating improved absorbency. The wiper is a combination of a relatively high basis weight layer of meltblown thermoplastic microfibers having on either side thereof a relatively lightweight layer of continuous filament thermoplastic fibers of larger diameter. All components are treated with a surfactant for wettability, and the combination is preferably bonded by a patterned application of heat and pressure. The resulting wiper is fabric-like, conformable, and useful for many industrial applications as well as general purpose wiping. Preferred thermoplastic materials are polyolefins, and the individual components are preferably made from the same polymer or polymers having similar melt temperatures. Preferred surfactants include ionic and nonionic surfactants such as dioctylester of sodium sulfosuccinic acid (Aerosol OT).

DESCRIPTION OF THE PREFERRED EMBODIMENTS

Figure 1:
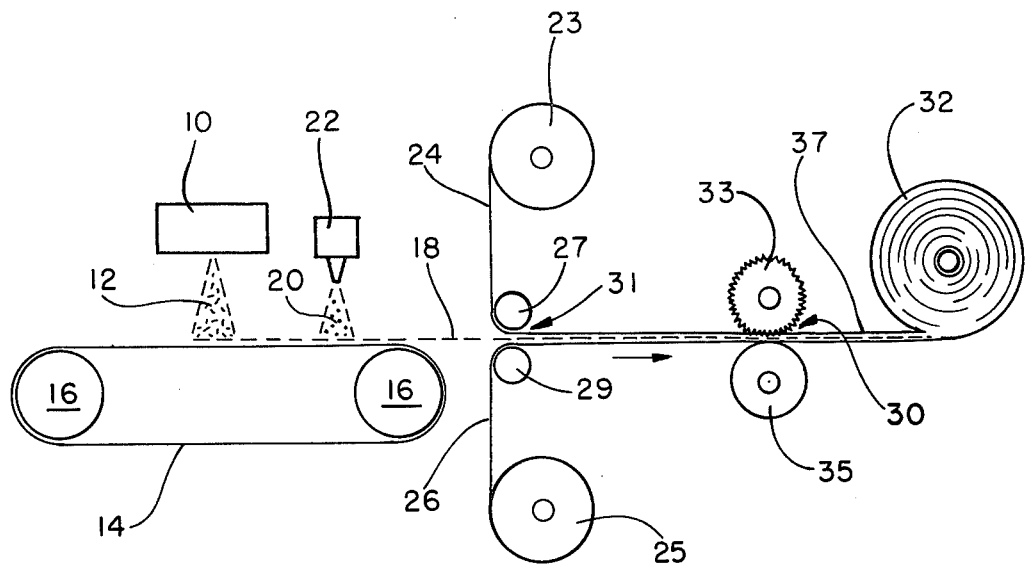
FIG. 1 schematically illustrates a process for making the wipes of the present invention.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

Meltblown webs produced for the wipers of the present invention are preferably manufactured in accordance with the process described in U.S. Pat. No. 3,978,185 to Buntin et al dated Aug. 31, 1976 which is incorporated herein by reference in its entirety and to which reference may be made for details of the meltblown process. Although the example below was carried out with polypropylene, it will be understood that the invention is not limited thereto and that other thermoplastic polymers capable of meltblowing, including polyethylene, polyesters, and polyamides, may be utilized as well. It is also desirable, in some cases, to incorporate other materials into the meltblown web such as cellulose fibers, for example. Such webs are described in U.S. Pat. No. 4,100,324 to Anderson, Sokolowski and Ostermeier dated July 11, 1978. For best results, in accordance with this invention, the webs contain at least about 30% by weight microfibers, preferably 50% by weight microfibers.

The continuous filament webs may be produced as described in the above identified patents or in copending U.S. application Ser. No. 146,450 to Appel and Morman (now U.S. Pat. No. 4,340,563 dated July 20, 1982). Suitable polymers include the same ones useful for the meltblowing process. Preferably polymers used for the component layers are the same.

In a preferred embodiment, the spunbounded layers are individually pattern bonded prior to combining with the meltblown layer. For example, a pattern as illustrated in U.S. Design Pat. No. 239,566 to Vogt dated Apr. 13, 1976 having about 153 bonds/in.$^2$ and about 25% bonded surface area may be employed as may be a pattern illustrated in U.S. Design Pat. No. 264,512 dated May 18, 1982. Such prebonding permits the use of lower overall bonded area when bonding the laminate.

In accordance with the invention, the meltblown web (including added fibers) will have a relatively high basis weight in the range of from about 17 to 170 gsm, preferably in the range of from about 34 to 85 gsm. In contrast, the individual continuous filament layers will have a relatively low basis weight in the range of from about 7 gsm to 34 gsm and preferably 10 gsm to 17 gsm.

Any of a wide variety of surfactants, ionic and nonionic may be employed with the individual component layers. These include, for example, dioctylester of sodium sulfosuccinic acid (Aerosol OT), isooctyl phenylpolyethoxy ethanol (Triton X-100 and X-102) and others.

Combining of the component webs is preferably accomplished by patterned application of heat and pressure. The particular bonding conditions will depend on the specific material, but in general, it is preferred to use a bond pattern employing about 10 to 250 pins/inch$^2$ (more preferably 20 to 110 bonds/inch$^2$) for a coverage of about 5 to 25% (more preferably 10–15%) of the surface area. The bonding temperature, for polypropylene, for example, is preferably in the range of from about 180° F. to 330° F. with a pressure preferably in the range of from about 150 pli. to about 400 pli. Reference may be had to U.S. Design Pat. No. 239,566 to Vogt dated Apr. 13, 1976 and U.S. Pat. No. 3,855,046 to Hansen and Pennings dated Dec. 17, 1974 for illustrations of bonding patterns.

Turning to FIG. 1, a process for forming the wiper material of the invention will be briefly described. Other forming and combining operations that may be utilized will be apparent to those skilled in the art, and it is not intended to limit the invention to the operation specifically set forth.

Figure 2:
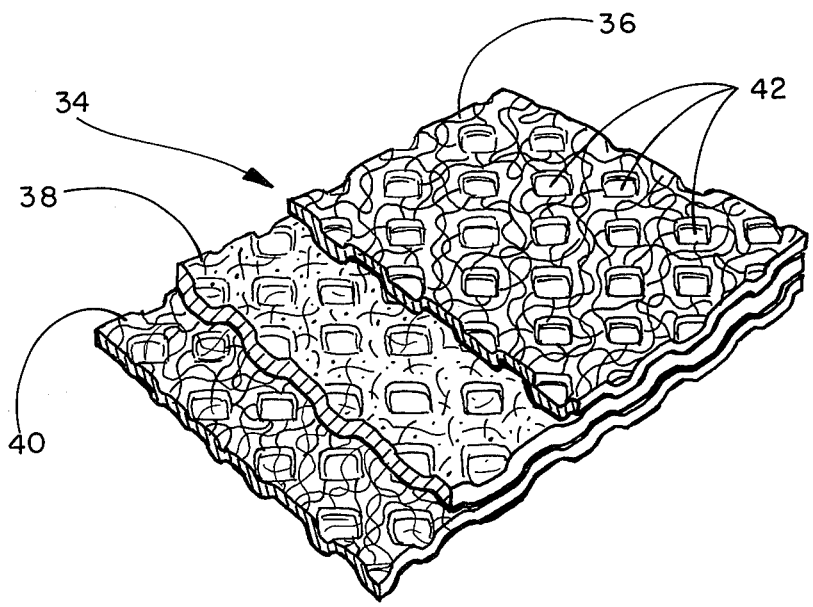
FIG. 2 illustrates the multi-component wiper of the present invention.
Figure 3:
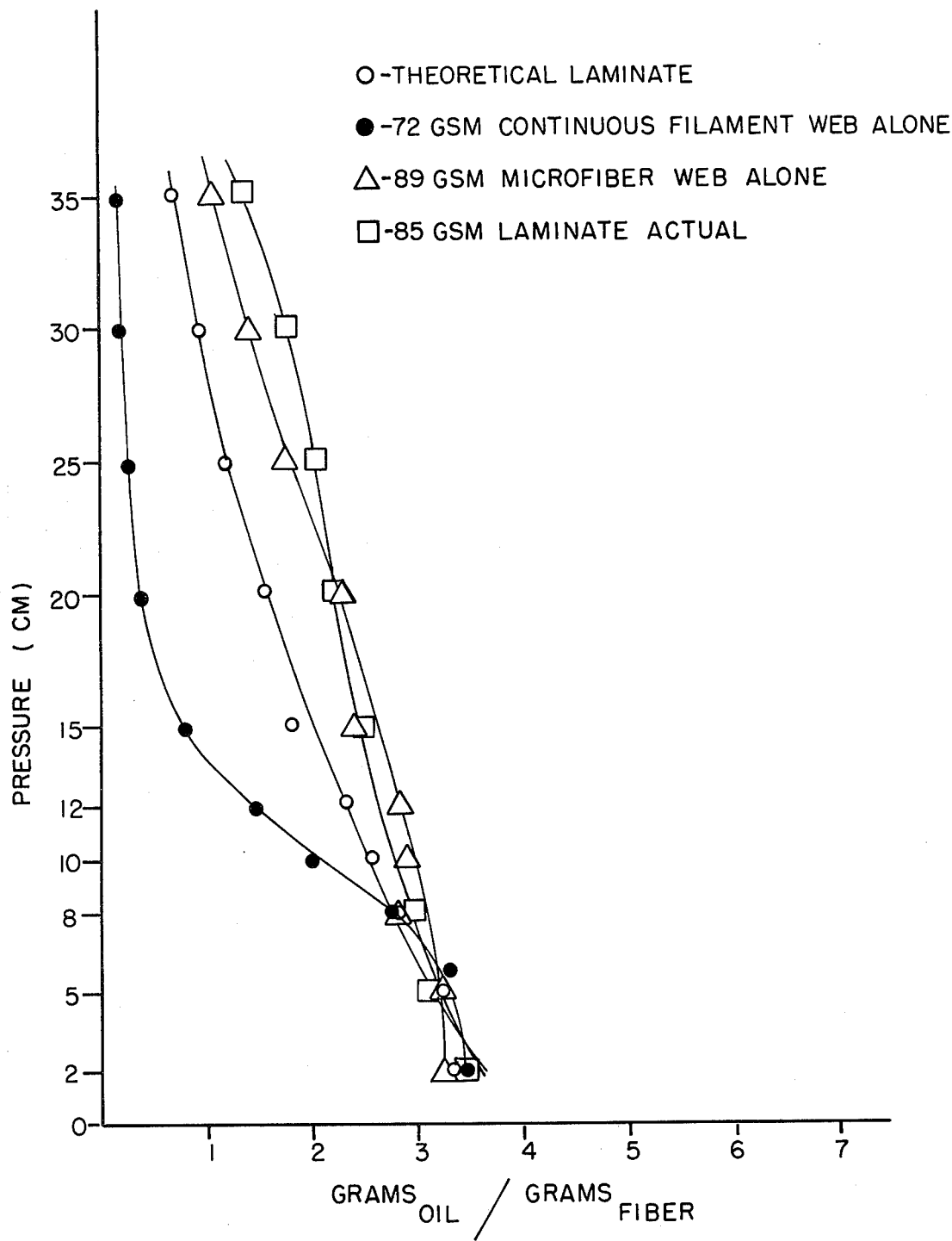
FIG. 3 illustrates graphically capillary suction test results.
Figure 4:
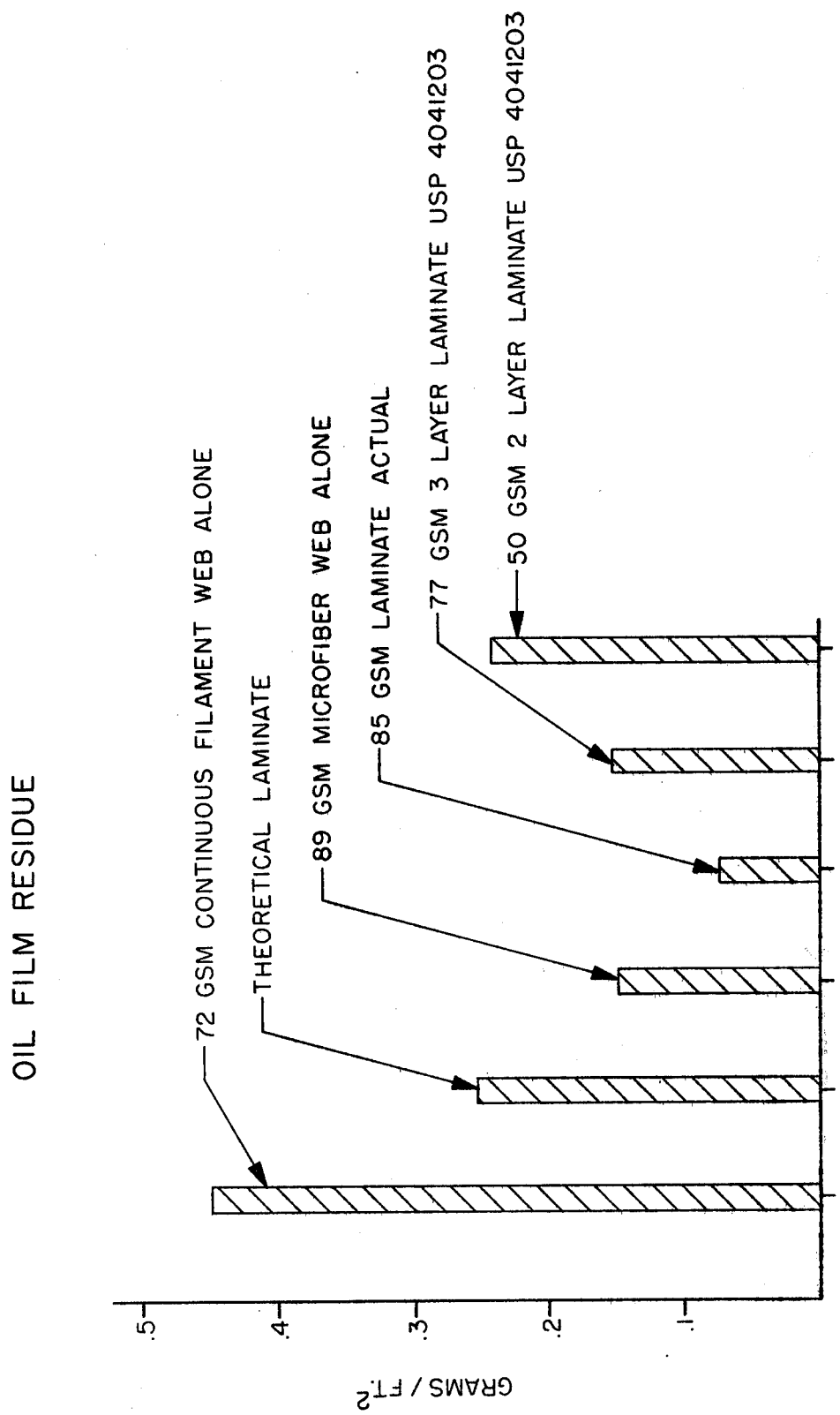
FIG. 4 illustrates graphically oil wiping test results.

As shown, meltblowing die 10 deposits microfibers 12 onto a moving wire 14 supported by rolls 16, one or more of which may be driven. A loose bat 18 is formed to which is added wetting agent 20 by spray nozzle 22. Spunbonded continuous filament webs 24, and 26 from parent rolls 23 and 25, respectively, are combined over turning rolls 27 and 29, with bat 18 at nip 31. The combination is bonded by heat and pressure at pattern calender nip 30 between patterned roll 33 and anvil roll 35, and laminate 37 is wound into parent roll 32 which may be slit into individual wipers shown, for example, in FIG. 2. Turning to FIG. 2, a three-ply laminate wiper 34 is illustrated including microfiber layer 38 and continuous filament layers 36, 40 with pattern bond areas 42.

The invention will now be described in terms of specific examples illustrating several embodiment.

EXAMPLE 1

A meltblown microfiber web having a basis weight of 54 gsm was formed in accordance with the process described in U.S. Pat. No. 3,978,185 to Buntin et al as follows: polypropylene resin having a melt index of 145 g measured at 177° C. and identified as Exxon PD 3145 was used. Production was at a rate of 20,000 yd$^2$ per hour and collected at a distance of 14 in. (35.5 cm) on a forming screen. The meltblown fibers were integrated into a web as formed generally in the manner illustrated in FIG. 1. Continuous filament webs formed from polypropylene resin having a melt index of 10–11 g measured at 177° C. and identified as Exxon PD 3045 prepared in accordance with U.S. Pat. No. 4,041,203 to Brock and Meitner dated Aug. 9, 1977 were each applied on opposite sides of the meltblown web and pattern bonded with a pattern generally as illustrated in U.S. Design Pat. No. 264,512 dated May 18, 1982 at a temperature of 290° F. and pressure of 220 pli with a bond pattern having 47 pins/in.$^2$ with each pin having an average individual area of 0.0028 in.$^2$ (0.018 cm$^2$). The combination had a basis weight of 85 gsm and other properties as described in the Table below.

EXAMPLE 2

Example 1 was repeated except that the meltblown web also contained 50% by weight woodpulp fibers added in the manner described in U.S. Pat. No. 4,100,324 to Anderson, Sokolowski, and Ostermeier dated July 11, 1978. The combination had a basis weight of 110 g/m$^2$ including 86 g/m$^2$ of meltblown/woodpulp and 12 g/m$^2$ of each spunbonded polypropylene.

EXAMPLE 3

Example 1 was repeated except that the meltblown web also contained 50% by weight of polyester staple fibers added in the manner described in U.S. Pat. No. 4,100,324 to Anderson, Sokolowski, and Ostermeier dated July 11, 1978. The combination had a basis weight of 110 g/m$^2$ including 86 g/m$^2$ of meltblown/staple and 12 g/m$^2$ of each spunbonded polypropylene.

The materials of Examples 1–3 were tested as indicated in the Table below as were materials representative of U.S. Pat. Nos. 4,307,143 to Meitner dated Dec. 22, 1981 and 4,041,203 to Brock and Meitner dated Aug. 9, 1977, with two examples of the latter, one of three layer laminate, and the other a two layer laminate.

TABLE

| Property/Sample | Basis Wt (GSM) | Lint[1] (.5μ) | Water[2] Absorbency % | Residue (g[2]) | Trapezoidal[4] Tear MD (g) | Tensile[5] Strength MD (g/in) | Bulk[6] (MM) |
|---|---|---|---|---|---|---|---|
| Example 1 | 85 | 27 | 517 | .075 | 1760 | 2170 | .79 |
| Example 2 | 110 | 240 | 455 | .122 | 1760 | 1930 | 1.22 |
| Example 3 | 110 | — | 395 | .137 | — | — | 1.07 |
| KIMTEX TM U.S. Pat. No. 4,307,143 Pat. No. | 81 | 57 | 500 | .150 | 817 | 1020 | .84 |

TABLE-continued

| Property/Sample | Basis Wt (GSM) | Lint[1] (.5μ) | Water[2] Absorbency % | Residue (g[2]) | Trapezoidal[4] Tear MD (g) | Tensile[5] Strength MD (g/in) | Bulk[6] (MM) |
| --- | --- | --- | --- | --- | --- | --- | --- |
| 4,041,203 3 Layer Laminate | 77 | 27 | 335 | .150 | 3050 | 2840 | .56 |
| 2 Layer Laminate | 50 | — | 389 | .240 | 2490 | 2380 | .43 |

[1] As described in U.S. Pat. No. 4,328,279 to Meitner and Englebert dated 4 May 1982.
[2] T.A.P.P.I. - T - 432
[3] As described in U.S. Pat. No. 4,307,143 to Meitner dated 22 December 1981.
[4] ASTM D-2263-34, page 483, part 24.
[5] ASTM D-1117-74
[6] Ames Bulk Tester As shown, the wiper of the present invention exhibits improved characteristics for wipers for oil and water, particularly in the features of absorbency and streak-free wiping. These results are particularly advantageous in food service wipes applications, for example, where leaving a streak-free stainless steel surface is often very important. Furthermore, the low lint characteristics are important for electronics and other applications where a dust-free environment is considered necessary. Other applications for high quality wiper products will be apparent such as, for example, in health care as surgeons' hand towels and the like.

While it is not desired to limit the invention to any theory, it is believed that the lightweight continuous filament outside webs provide wicking action which rapidly draws liquid through to the highly absorbent microfiber layer. This microfiber layer then aggressively holds the liquid within its interstices and resists streaking.

Thus is is apparent that there has been provided, in accordance with the invention, a wipe material that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:

1. Wiper comprising a laminate including a relatively high basis weight web having a basis weight in the range of from about 17 to 170 g/m² comprising meltblown thermoplastic microfibers having an average diameter in the range of up to about 10 microns and treated with a surfactant and, on both sides of said meltblown web, a relatively low basis weight web having a basis weight in the range of from about 7 to 34 g/m² comprising generally continuous thermoplastic filaments having an average diameter in excess of about 10 microns wherein the proportion of the microfiber web to the combined outer webs is at least about 2 to 1 by weight.

2. The wiper of claim 1 wherein the proportion of the microfiber web to the combined outer webs is about 2 to 1 to about 4 to 1 by weight.

3. The wiper of claim 1 or 2 wherein the microfiber and outer webs comprise polypropylene.

4. The wiper of claim 3 wherein the surfactant treatment for the meltblown web is selected from a group consisting of ionic and nonionic surfactants and the continuous filament web is treated with a surfactant selected from the group consisting of ionic and nonionic surfactants.

5. The wiper of claim 3 wherein the laminate is bonded by a patterned application of heat and pressure.

6. The wiper of claim 5 wherein the bond pattern occupies about 5% to 25% of the laminate surface and the number of bonds is in the range of from about 10 to 250 pins/in.².

7. The wiper of claim 1 wherein the microfiber layer contains up to about 70% woodpulp.

8. The wiper of claim 1 wherein the microfiber layer contains up to about 70% staple fibers.

9. The wiper of claim 5 wherein the continuous filament outer layers are prebonded prior to lamination with the microfiber layer.

* * * * *